US009109840B2

United States Patent
Kadle et al.

(10) Patent No.: US 9,109,840 B2
(45) Date of Patent: Aug. 18, 2015

(54) UNITARY HEAT PUMP AIR CONDITIONER HAVING A HEAT EXCHANGER WITH AN INTEGRAL ACCUMULATOR

(75) Inventors: Prasad S. Kadle, Williamsville, NY (US); Gary S. Vreeland, Medina, NY (US); Frederick V. Oddi, Orchard Park, NY (US)

(73) Assignee: Delphi Technologies, Inc., Troy, MI (US)

( * ) Notice: Subject to any disclaimer, the term of this patent is extended or adjusted under 35 U.S.C. 154(b) by 567 days.

(21) Appl. No.: 13/453,550

(22) Filed: Apr. 23, 2012

(65) Prior Publication Data

US 2012/0216562 A1 Aug. 30, 2012

Related U.S. Application Data

(63) Continuation-in-part of application No. PCT/US2012/025419, filed on Feb. 16, 2012, and a continuation-in-part of application No. 13/396,211, filed on Feb. 14, 2012.

(60) Provisional application No. 61/443,774, filed on Feb. 17, 2011.

(51) Int. Cl.
*F25D 3/00* (2006.01)
*F28D 9/00* (2006.01)
(Continued)

(52) U.S. Cl.
CPC ............ *F28D 9/005* (2013.01); *B60H 1/00899* (2013.01); *F25B 30/02* (2013.01);
(Continued)

(58) Field of Classification Search
CPC .......... F25D 17/02; F25B 30/02; F25B 41/00; F25B 2400/16; F25B 40/00; F25B 25/005; F25B 2339/047; F28F 3/08; F28D 9/005; F28D 9/0093; F28D 2021/0084; F28D 2021/0085; F28D 2021/0068; B60H 1/00899

USPC ............... 62/434, 498, 509, 513, 507, 324.6; 165/166

See application file for complete search history.

(56) References Cited

U.S. PATENT DOCUMENTS

| 4,688,394 A | 8/1987 | Waldorf |
|---|---|---|
| 5,289,698 A | 3/1994 | Garimella |
| 5,355,689 A | 10/1994 | Hara et al. |

(Continued)

FOREIGN PATENT DOCUMENTS

| EP | 0999078 | 1/2004 |
|---|---|---|
| FR | 2780490 | 6/1998 |

OTHER PUBLICATIONS

Valeo, Thermal Management—Ultimate Cooling: Solutions for Clean, Fuel Efficient & "Fun to Drive" Gas and Diesel Engines; Dr. De Pelsemaeker Georges; pp. 1-20.

*Primary Examiner* — Cheryl J Tyler
*Assistant Examiner* — Ana Vazquez
(74) *Attorney, Agent, or Firm* — Brinks Gilson & Lione (57) ABSTRACT

The disclosure relates to a unitary heat pump air conditioner (Unitary HPAC) having a plate type exchanger assembly, an electrically driven compressor, and coolant pumps. The plate heat exchanger assembly includes a plurality of plates stacked and hermetically sealed between an upstream end plate and a downstream end plate. The stacked plates define a condenser/chiller portion adjacent the upstream end plate, an accumulator portion adjacent the downstream end plate, and an evaporator/chiller portion sandwiched between the condenser/chiller portion and the accumulator portion. A refrigerant passageway extends through the plate type heat exchanger assembly, a hot coolant passageway extends through the condenser/chiller portion, and a cold coolant passageway extends through the evaporator/chiller portion. The cold coolant passageway and the hot coolant passageway are in non-contact thermal communication with the refrigerant passageway.

20 Claims, 6 Drawing Sheets

(51) Int. Cl.
*B60H 1/00* (2006.01)
*F25B 30/02* (2006.01)
*F25B 39/00* (2006.01)
*F28D 21/00* (2006.01)
*F25B 25/00* (2006.01)

(52) U.S. Cl.
CPC .............. *F25B 39/00* (2013.01); *F28D 9/0093* (2013.01); *F25B 25/005* (2013.01); *F25B 2339/047* (2013.01); *F28D 2021/0068* (2013.01); *F28D 2021/0084* (2013.01); *F28D 2021/0085* (2013.01)

(56) References Cited

U.S. PATENT DOCUMENTS

| | | |
|---|---|---|
| 6,082,128 A | 7/2000 | Lake et al. |
| 6,230,508 B1 | 5/2001 | Baker et al. |
| 6,405,793 B1 | 6/2002 | Ghodbane et al. |
| 7,063,137 B2 | 6/2006 | Kadle et al. |
| 7,762,090 B2 * | 7/2010 | Lee ................... 62/93 |
| 2003/0041619 A1 * | 3/2003 | Lu ................... 62/617 |
| 2004/0031596 A1 * | 2/2004 | Nishida et al. ............... 165/140 |
| 2009/0107424 A1 * | 4/2009 | Blassnitz et al. ............. 123/41.12 |
| 2011/0120182 A1 * | 5/2011 | Haussmann ................. 62/524 |
| 2011/0146318 A1 * | 6/2011 | Wittmann et al. .......... 62/238.7 |
| 2011/0213305 A1 * | 9/2011 | Jonsson et al. ............... 604/113 |

* cited by examiner

UNITARY HEAT PUMP AIR CONDITIONER HAVING A HEAT EXCHANGER WITH AN INTEGRAL ACCUMULATOR

CROSS-REFERENCE TO RELATED APPLICATION

This application is a continuation-in-part of International Application No. PCT/US2012/025419, filed on 16 Feb. 2012, which claims the benefit of U.S. Provisional Patent Application No. 61/443,774, filed 17 Feb. 2011.

This application is also a continuation-in-part of U.S. patent application Ser. No. 13/396,211, filed on 14 Feb. 2012, which claims the benefit of U.S. Provisional Patent Application No. 61/443,774, filed 17 Feb. 2011.

Each of International Application No. PCT/US2012/025419, U.S. patent application Ser. No. 13/396,211, and U.S. Provisional Patent Application No. 61/443,774 is hereby incorporated by reference in its entirety.

TECHNICAL FIELD OF INVENTION

The present disclosure relates to a heating and air-conditioning system for an automotive vehicle; particularly, to a heat pump air-conditioning system; still more particularly, to a heat exchanger for a heat pump air-conditioning system.

BACKGROUND OF INVENTION

For the comfort of the occupants in the passenger compartment, motor vehicles typically include dedicated air-conditioning systems and heating systems. The heating system includes a heater core located inside a heating, ventilating, and air conditioning (HVAC) module of the vehicle. The heater core is typically a liquid-to-air heat exchanger that supplies thermal energy to the passenger compartment for comfort heating. A heat transfer liquid, such as a glycol based coolant, conveys waste heat from an internal combustion engine to the heater core where the thermal energy from the heat transfer liquid is transferred to the ambient air flowing through the heater core to the passenger compartment. With the advent of greater efficiency internal combustion engines, hybrid vehicles having smaller internal combustion engines, and especially electrically driven vehicles, the amount of thermal energy available to provide comfort to occupants in the passenger compartment may not be adequate.

To provide supplemental heat to the passenger compartment for vehicles having smaller internal combustion engines, it is known to operate the air-conditioning system in heat pump mode. A typical motor vehicle air-conditioning system includes an evaporator located in the HVAC module and a condenser located in the front engine compartment exposed to outside ambient air. A compressor circulates a two-phase refrigerant through the evaporator where it expands into a low pressure vapor refrigerant by absorbing heat from the passenger compartment. After the low pressure vapor is compressed to a high pressure vapor by the compressor, the vapor phase refrigerant is transferred to the condenser where the high pressure vapor is condensed into a high pressure liquid refrigerant by releasing the heat to the ambient air. The liquid phase is returned to the evaporator through an expansion device which converts the high pressure liquid refrigerant to a low pressure mixture of liquid and vapor refrigerant to continue the cycle. By operating the air-conditioning system in heat pump mode, the refrigerant flow is reversed, in which case the condenser absorbs heat from the outside ambient air by evaporating the liquid phase refrigerant and the evaporator releases the heat to the passenger compartment by condensing the vapor phase refrigerant. One disadvantage to operating the air-conditioning system in heat pump mode, since the low pressure side of the system when used in air conditioning mode would become the high pressure side when used in heat pump mode, is the increase in system complexity due to the requirement of having to reinforce the refrigerant plumbing throughout the system by using thicker gage tubing and fittings. There is also the need to reinforce the evaporator to withstand the high pressure refrigerant, and to install an additional expansion device and receiver together with additional associated plumbing. Another known disadvantage of operating the system in heat pump mode is that in cooler climates, as the surface temperature of the condenser drop below 32° F., any moisture condensed on the surface of the condenser is subject to freezing, therefore resulting in reduced efficiency of the system and even potentially damaging the condenser.

Electric heaters are known to be used to provide supplemental heat to the passenger compartment for vehicles using the air-conditioning system as a heat pump. In the coldest of climates, it is known that operating the air-conditioning system in heat pump mode is ineffective; therefore, additional electric heaters are required. However, for hybrid and electrical vehicles, electrical heaters represent an increased current draw that significantly reduces the electric drive range.

Based on the foregoing, there is need for a heating system that provides supplementary heat to the passenger compartment of a motor vehicle that does not require reversing the refrigerant cycle of the air-conditioning system or detrimentally impact the electric driving range.

SUMMARY OF THE INVENTION

The present invention relates to a Unitary Heat Pump Air Conditioner (Unitary HPAC) having a plate type exchanger assembly, an electrically driven compressor, and electrically driven coolant pumps. The plate type heat exchanger assembly includes a plurality of plates stacked and hermetically sealed between an upstream end plate and a downstream end plate. The stacked plates define a condenser/chiller portion adjacent the upstream end plate, an accumulator portion adjacent the downstream end plate, and an evaporator/chiller portion sandwiched between the condenser/chiller portion and the accumulator portion.

The upstream end plate includes a refrigerant inlet, a hot coolant inlet, and a hot coolant outlet. The downstream end plate includes a refrigerant outlet, a cold coolant inlet, and a cold coolant outlet. A refrigerant passageway extends through the plate-type heat exchanger assembly and in hydraulic communication with the refrigerant inlet and the refrigerant outlet, a hot coolant passageway extends through the condenser/chiller portion and in hydraulic communication with the hot coolant inlet and the hot coolant outlet, and a cold coolant passageway extends through the evaporator/chiller portion and in hydraulic communication with the cold coolant inlet and the cold coolant outlet. The cold coolant passageway and the hot coolant passageway are in non-contact thermal communication with the refrigerant passageway.

The plate heat exchanger assembly may include a refrigerant expansion device having an entry end and an exit end disposed within a refrigerant expansion chamber of the evaporator/chiller portion. The entry end of the refrigerant expansion device is in hydraulic communication with the refrigerant passageway within the condenser/chiller portion and the exit end is in hydraulic communication with the refrigerant expansion chamber.

The accumulator portion of the plate heat exchanger assembly may include an oil pick-up tube in hydraulic communication with the refrigerant outlet and the lower volume of the accumulator portion. As the refrigerant exits the refrigerant outlet, the velocity of the refrigerant creates a venturi effect in which any free liquid settled out in the bottom volume of the accumulator portion is pulled into the refrigerant flow by the oil pick-up tube and recycled back through the refrigerant loop.

An embodiment of the invention provides a Unitary HPAC that is compact and easily installed in virtually any compartment of a vehicle that is about the size a typical bread box. In vehicles with small efficient internal combustion engines, the Unitary HPAC scavenges heat from waste heat sources, such as the vehicle electronics, and use the waste heat to supplement the heating needs of the passenger compartment. In hybrid and electric vehicles, the Unitary HPAC improves the driving ranges in cold climates by minimizing the use of electric current to power electric heaters and providing heat to the battery packs to maintain an optimal operating temperature. Further features and advantages of the invention will appear more clearly on a reading of the following detailed description of an embodiment of the invention, which is given by way of non-limiting example only and with reference to the accompanying drawings.

BRIEF DESCRIPTION OF DRAWINGS

This invention will be further described with reference to the accompanying drawings in which.

DETAILED DESCRIPTION OF INVENTION

Figure 1:
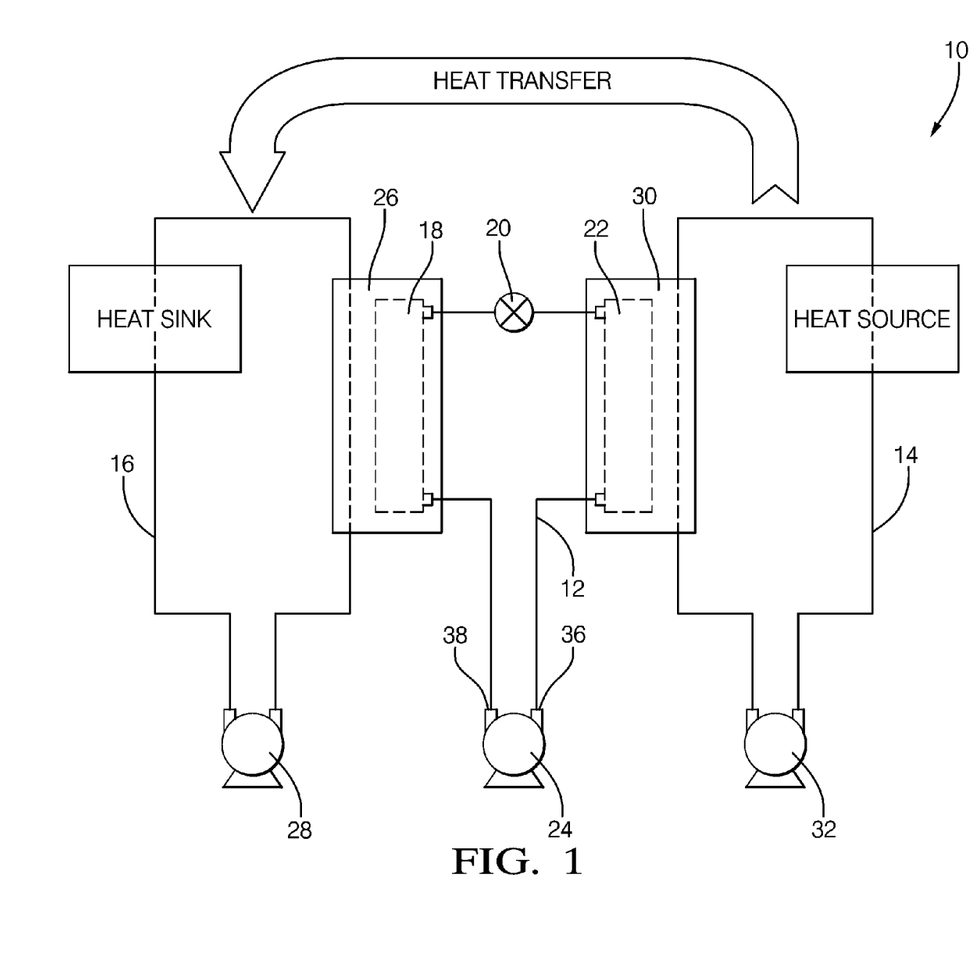
FIG. 1 shows a schematic of a Unitary Heat Pump Air Conditioner (Unitary HPAC) System.

Referring to FIG. 1 through FIG. 7, wherein like numerals indicate corresponding parts throughout the several views, is a Unitary Heat Pump Air Conditioner (Unitary HPAC) system 10 having a Unitary HPAC 100 with a plate type heat exchanger assembly assembly 102 in accordance with the invention for use in a motor vehicle. The motor vehicle may be that of one with an internal combustion engine, a hybrid vehicle having both an internal combustion engine and an electric drive, or that of an electric vehicle having an electric drive. The Unitary HPAC System 10 includes a Unitary HPAC 100 that is compact and easily installed in virtually any compartment of the vehicle that is about the size of a bread box or larger. Further advantages of the Unitary HPAC 100 will be readily appreciated by the reading of the disclosure below Shown in FIG. 1 is flow schematic of the Unitary HPAC system 10 having a refrigerant loop 12 in thermal communication with a cold coolant loop 14 and a hot coolant loop 16. The main components of the refrigerant loop 12 include a condenser 18, a refrigerant expansion device 20, and an evaporator 22 hydraulically connected in series. At the heart of the refrigerant loop is a refrigerant compressor 24 located downstream of the evaporator 22 and upstream of the condenser 18. The compressor 24 is responsible for compressing and transferring a two-phase refrigerant, such as R-134a or R-1234yf, throughout the refrigerant loop 12 of the Unitary HPAC System 10. The hot coolant loop 16 includes a hot side chiller 26 in thermal communication with the condenser 18 and a hot side coolant pump 28 that circulates a hot side coolant through the hot side chiller 26. Similarly, the cold coolant loop 14 includes a cold side chiller 30 in thermal communication with the evaporator 22 and a cold side coolant pump 32 that circulates a cold side coolant through the cold side chiller 30. The hot side chiller 26 and cold side chiller 30 may be that of a water jacket encasing the condenser 18 and evaporator 22, respectively, or may be that of a plate-type heat exchanger, which is disclosed in greater detail below, having separate non-contact passageways. The cold coolant loop 14 may absorb waste heat energy from various heat sources throughout the vehicle, such as the waste heat from the internal combustion engine or electronics, thereby cooling the various heat sources. The refrigerant loop 12 transfers the heat energy from the cold coolant loop 14 to the hot coolant loop 16, which in turn transfer the heat energy to various heat sinks throughout the vehicle, such as an occupant heat exchanger to provide supplemental heat to the passenger compartment. In essence, the Unitary HPAC System 10 effectively captures waste heat energy from one part of the vehicle and puts it to beneficial use within another part of the vehicle. As an alternative, the heat sink may be a radiator type heat exchanger exposed to the outside ambient air where the waste heat is dissipated to the external environment. The flow paths of the cold and hot coolant loops 14, 16 throughout the vehicle may be reconfigured based on the cooling and heating needs of the vehicle. The cold and hot coolant loops 14, 16 may include a myriad of interconnecting branches with remotely activated valves at strategic nodes that may be reconfigured to redefine the flow paths of the cold and hot coolant loops 14, 16 to selectively provide cold or hot coolant flows to multiple designated heat sources or heat sinks, respectively The refrigerant cycle of the refrigerant loop 12 is typically the same as that of a dedicated air conditioning system of a motor vehicle operating in cooling mode. A two phase refrigerant is circulated through the refrigerant loop 12 by the compressor 24, which includes a suction side 36, also referred to as the low pressure side, and a discharge side 38, also referred to as the high pressure side. The suction side of the compressor receives a low pressure vapor phase refrigerant from the evaporator 22, after absorbing heat from the cold side coolant, and compresses it to a high pressure vapor phase refrigerant, which is then discharged to the condenser 18. As the high pressure vapor phase refrigerant is condensed to a high pressure liquid phase refrigerant in the condenser 18, heat is transferred to the hot side coolant flowing through the hot side chiller 26. Exiting the condenser 18, the high pressure liquid phase refrigerant may pass through a refrigerant expansion device 20, through which the refrigerant begins to expand into a mixture of a bubbling gas-liquid phase. The bubbling gas-liquid phase refrigerant enters the evaporator 22 and continues to expand into the low pressure vapor refrigerant, which is then cycled back to the suction side 36 of the compressor 24 to repeat the process.

Figure 2:
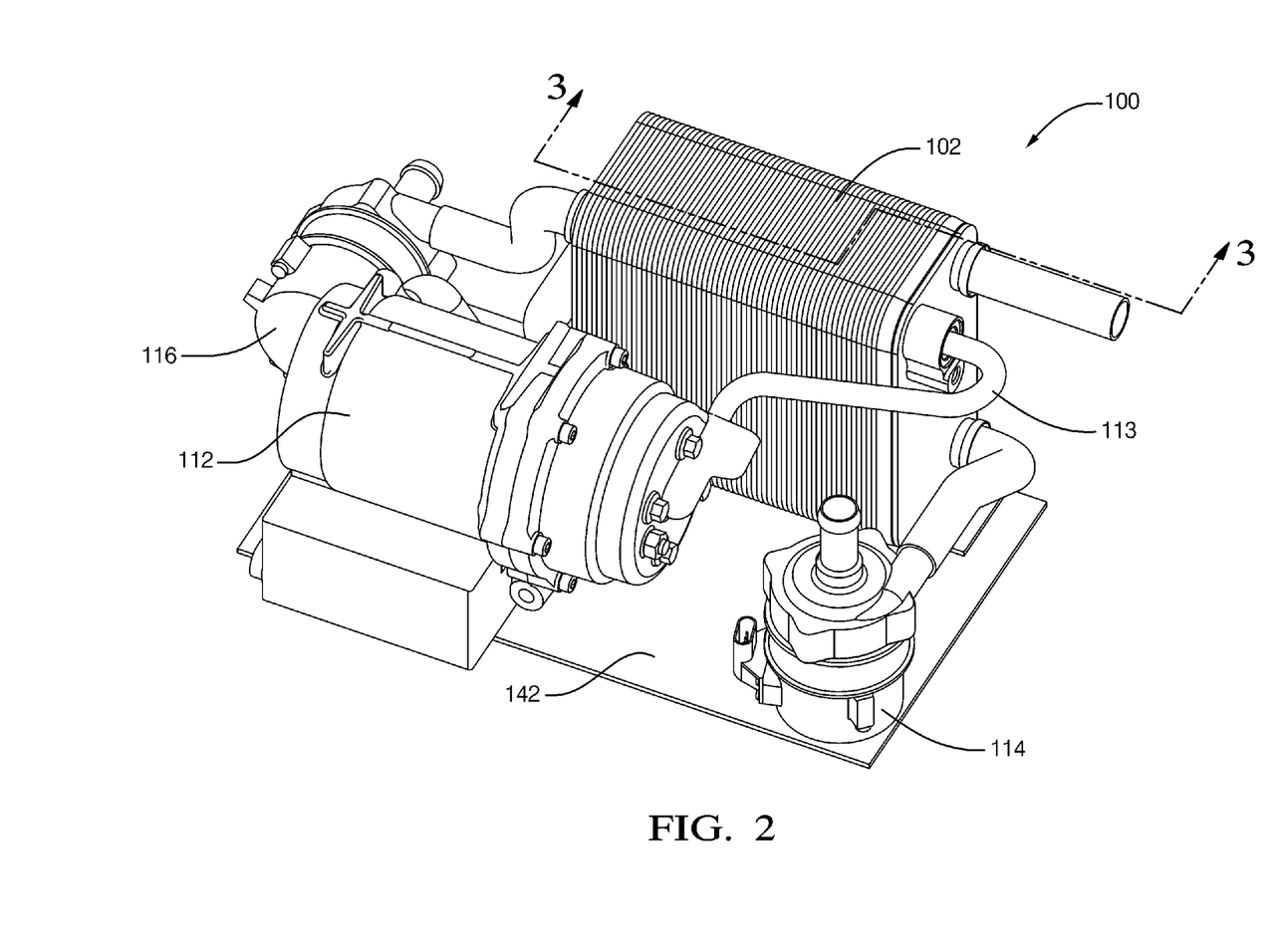
FIG. 2 shows an embodiment of a Unitary HPAC in accordance with the invention having a plate type heat exchanger assembly with an integrated accumulator.

Shown in FIG. 2 is one embodiment of the Unitary HPAC 100, which includes a plate type heat exchanger assembly 102, an electrically driven compressor 112 for the circulation of a typical two-phase refrigerant through a series of refrigerant tubes 113, and electrically driven cold side and hot side coolant pumps 114, 116 for the circulation of a cold side coolant and hot side coolant through the plate-type heat exchanger assembly 102. The plate-type heat exchanger assembly 102 may also be referred to as a plate-type HPAC heat exchanger 102. The compressor 112 may be that of a compact scroll compressor driven by a permanent magnet motor with neodymium magnets. The liquid coolant used in the hot and coolant loops is generally a mixture of 70% glycol-30% water, which prevents the coolant from freezing or becoming too viscous at the low temperatures needed in the cold-side heat exchanger assembly 110. The plate type heat exchanger assembly 102 together with the associated electrically driven compressor 112 and coolant pumps 114, 116 may be mounted onto a platform 142 or enclosed in a housing measuring approximately 380 mm by 250 mm by 180 mm or smaller.

Referring to FIGS. 3 through 7, the plate type heat exchanger assembly 102 includes a condenser/hot side chiller portion 104, an evaporator/cold side chiller 106 portion, and an accumulator portion 108 integrally connected in series. The plate type heat exchanger assembly 102 may also include an internal heat exchanger portion (not shown) sandwiched between the condenser/hot side chiller portion 104 and evaporator/cold side chiller 106 portion as disclosed in U.S. patent application Ser. No. 13/396,211.

Figure 3:
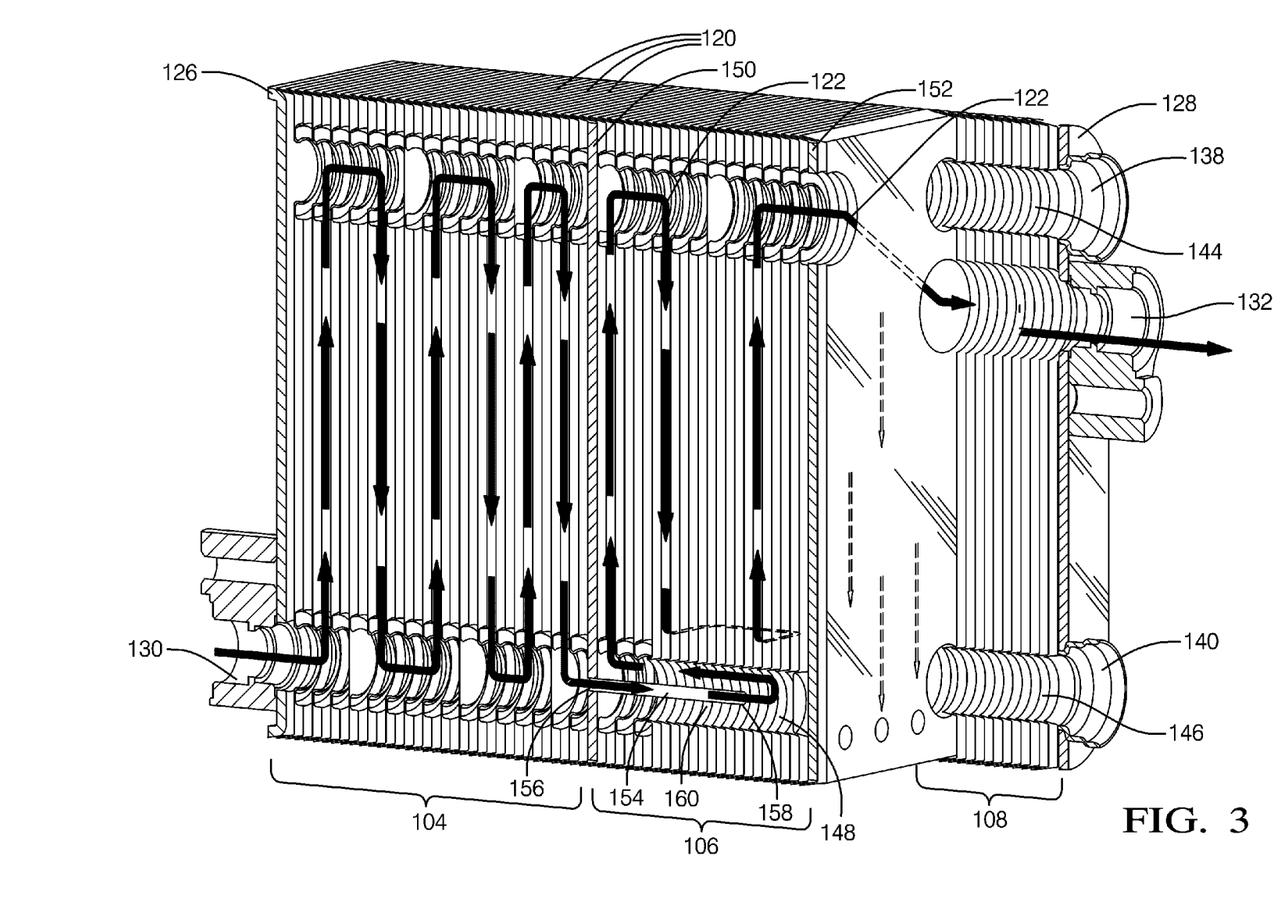
FIG. 3 shows a cross-sectional view of the plate type heat exchanger assembly of FIG. 2 along line 3-3.
Figure 4:
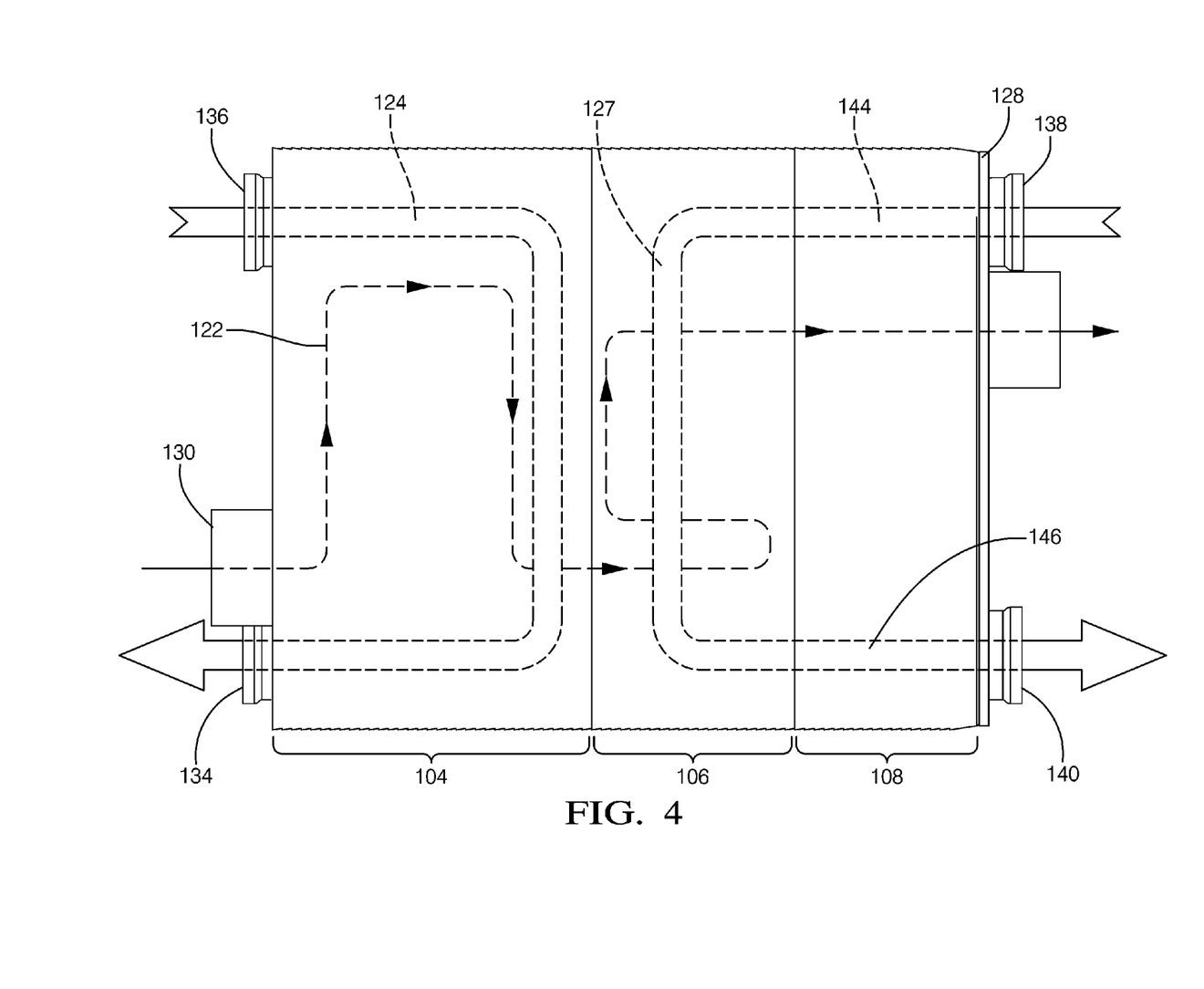
FIG. 4 shows a schematic diagram of the hot coolant flow, cold coolant flow, and refrigerant flow through the Plate type heat exchanger assembly of FIG. 2.
Figure 5:
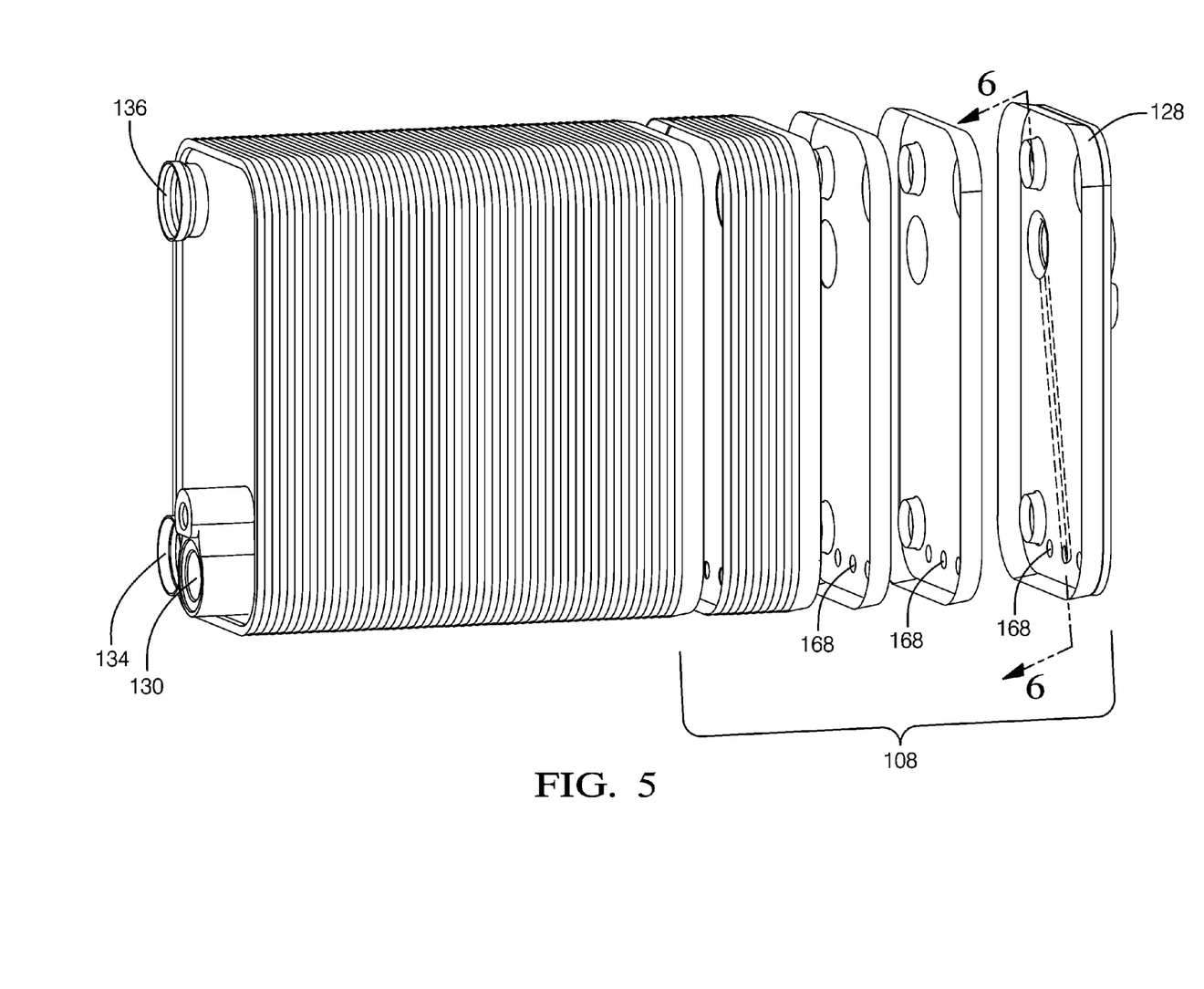
FIG. 5 shows a perspective partially exploded view of the Plate type heat exchanger assembly of FIG. 2.

Shown in FIGS. 3 through 5, the plate type heat exchanger assembly 102 is essentially a plate-type heat exchanger formed of a plurality of corrugated metal plates 120 stacked and brazed between an upstream end plate 126 and a downstream end plate 128, with respect to the direction of the refrigerant flow. The upstream end plate 126 includes a high pressure refrigerant inlet 130, a hot coolant inlet 136, and a hot coolant outlet 134. The downstream end plate 128 includes a low pressure refrigerant outlet 132, a cold coolant inlet 138, and a cold coolant outlet 140. The plurality of corrugated metal plates 120 include features known to those of ordinary skill in the art, such as openings 121, bosses 123 about selected openings 121, flanges 125, and flow spaces, which when stacked and brazed, define a refrigerant passageway 122 through the plate type heat exchanger assembly 102, a hot coolant passageway 124 through the condenser/hot side chiller portion 104, a cold coolant passageway 127 through the evaporator/cold side chiller portion 106, a cold coolant inlet header 144 in fluid communication between the cold coolant inlet 138 and cold coolant passageway 127, and a cold coolant outlet header 146 in fluid communication between the cold coolant outlet 140 and cold coolant passageway 127.

FIG. 4 shows a schematic flow path of the hot coolant passageway 124 through the condenser/hot side chiller portion 104 and the flow path of the cold coolant passageway 127 through the evaporator/cold side chiller portion 106 of the plate type heat exchanger assembly 102. A cold coolant enters the cold coolant inlet 138, then flows directly through the substantially straight cold coolant inlet header 144, meanders through the evaporator/cold chiller portion 106, and then exits the cold coolant outlet 143 by way of the substantially straight cold coolant outlet header 146. The hot coolant enters the hot coolant inlet 136, meanders through the evaporator/hot chiller portion 104, and then exits through the hot coolant outlet 134. Both the hot coolant passageway 124 and cold coolant passageway 127 are in non-contact thermal communication with the refrigerant passageway 122 within their respective portions 104, 106 of the plate type heat exchanger assembly 102. For clarity of illustration, the path of the hot and cold coolant passageways 124, 127 through their respective portions 104, 106 are simplified as a U-path; but in actuality, the paths of the coolants 124, 127 may be following a meandering path that is concurrent or counter-current to that of the refrigerant passageway 122 defined within each respective portions 104, 106. Non-contact thermal communication means that the flow of coolants and refrigerant do not co-mingle, but there is thermal communication for heat transfer between the respective fluids flowing within each of the three portions 104, 106, 108.

Referring to FIG. 3, the stacked and brazed corrugated metal plates 120 further define a substantially cylindrical refrigerant expansion chamber 148 extending from the first boundary plate 150 toward the second boundary plate 152. Disposed within the refrigerant expansion chamber 148 is a refrigerant expansion tube 154 having an entry end 156 and an exit end 158. The entry end 156 of the refrigerant expansion tube 154 is in fluid communication with the refrigerant passageway exiting the condenser/hot side chiller portion 104 and the exit end 158 is in fluid communication with the refrigerant expansion chamber 148 adjacent the second boundary plate 152. An annular refrigerant passageway 160 is defined between the expansion tube 154 and refrigerant expansion chamber 148.

FIG. 3 shows the flow path of the refrigerant passageway 122 through the entire plate type heat exchanger assembly 102. A high vapor pressure refrigerant enters the refrigerant inlet 130 and condenses into a high pressure liquid refrigerant as it releases heat to the hot coolant flow in the hot coolant passageway 124. The high pressure liquid refrigerant continues through the expansion tube 154 and begins to expand into a bubbling liquid phase refrigerant as it exits into the expansion chamber 148. The bubbling liquid phase refrigerant continues to expand and flows back through the annular refrigerant passageway 160 in the direction of the first boundary plate 150 and into the entry of the refrigerant passageway 122 of the evaporator/cold side chiller portion 106. The refrigerant continues to expand into a vapor phase refrigerant as it meanders through the evaporator/cold side chiller portion 106 absorbing heat from the cold coolant flow through the cold coolant passageway 127. The vapor phase refrigerant then flows through the accumulator portion 108 of the plate type heat exchanger assembly 102 before exiting the refrigerant outlet 132. While flowing through the accumulator portion 108, any free liquids or non-volatized refrigerant oil 162 settles to the bottom, with respect to gravity, of the accumulator portion 108.

Figure 6:
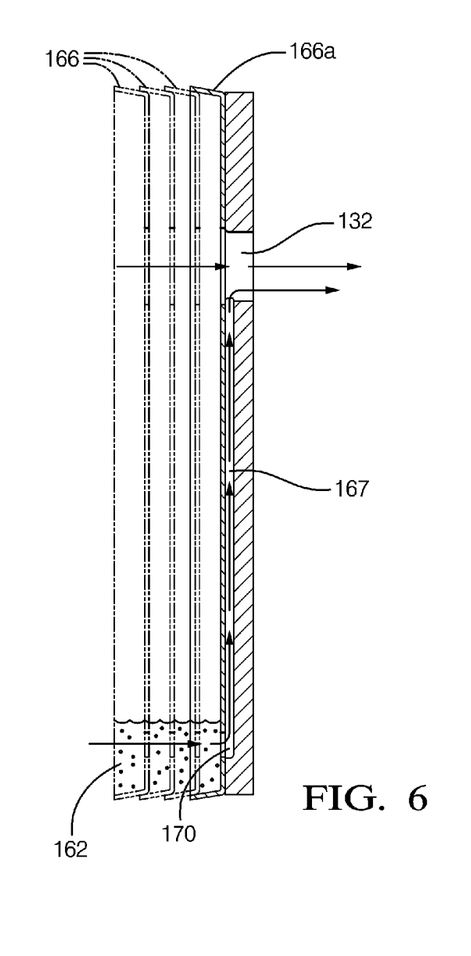
FIG. 6 shows a partial cross-sectional view of the accumulator portion of the Plate type heat exchanger assembly of FIG. 2.
Figure 7:
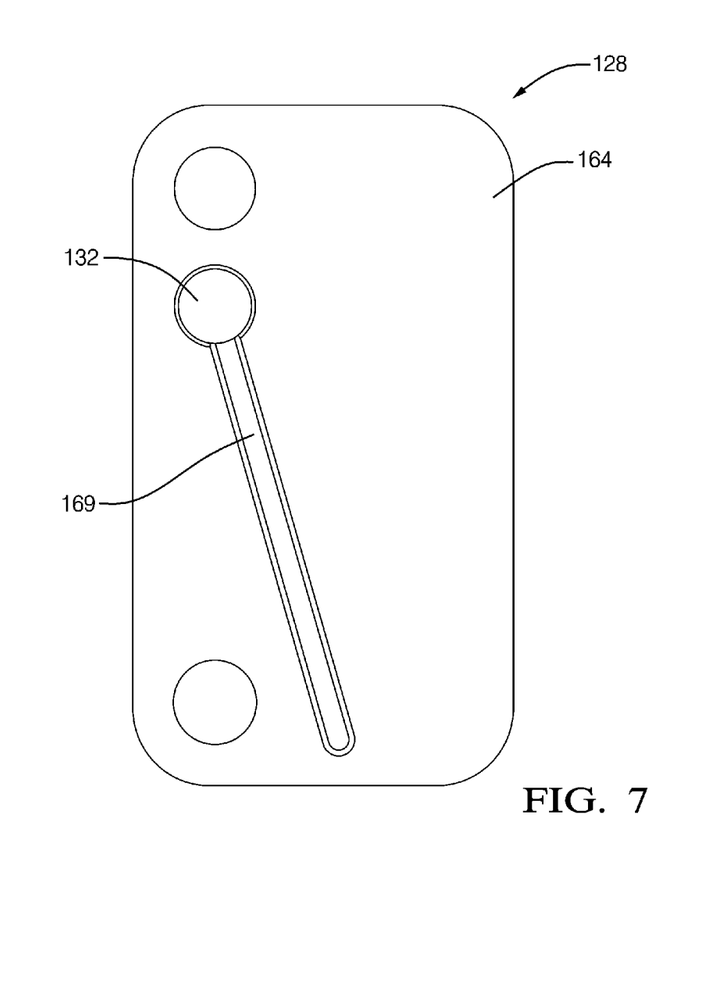
FIG. 7 shows the downstream end plate of the Plate type heat exchanger assembly of FIG. 2.

Referring to FIGS. 5 through 7, the interior surface 164 of the downstream end plate 128 defines a channel depression 169 extending from the refrigerant outlet 132 downward to adjacent the bottom of the downstream plate 128. Once the downstream end plate 128 is stacked against the adjacent plate 166a, the channel depression 169 cooperates with the surface of the adjacent plate 166a to define an oil pick-up tube 167. Referring to FIGS. 5 and 6, the plates 166 of the accumulator portion 108 include a plurality of apertures 168 positioned near the bottom portion of the plates 166. The end of the oil pick-up tube cooperates with one of the aperture 168 of an adjacent plate 166a to define a refrigerant oil entry port 170. As the refrigerant flows out of the refrigerant exit 132, the velocity of the refrigerant creates a venturi effect in which any free liquid settled out in the bottom volume of the accumulator portion is pulled into the refrigerant flow by the oil pick-up tube and recycled back through the refrigerant loop. The bottom volume of the accumulator portion 108 contains a mixture of oil and refrigerant, but richer in the concentration of oil. It should be understood that the feature of the oil pick-up tube 167 could be that of a tube that is separately installed in the refrigerant outlet 132, in which the tube physically extends into the bottom portion of the accumulator portion 108.

Referring back to FIG. 2, unlike a traditional air conditioning system, where the refrigerant side components are remotely dispersed throughout the engine bay and within the HVAC module, the components of the Unitary HPAC 100 including the plate type heat exchanger 102 and electrically driven compressor 112 and coolant pumps 114, 116 may be all mounted onto a single platform 142 measuring approximately 380 mm by 250 mm. The components may be enclosed in housing, having a similar sized base and a height of about less than 180 mm, which is approximately the size of a typical bread box, for ease of handling and protection against the environment. The centralized location of the components that form the Unitary HPAC 100 allows the use of shorter length refrigerant tubes 113 which are manufactured from a refrigerant impermeable material, such as stainless steel, aluminum, and/or copper. The shorter length refrigerant impermeable tubes 113 minimize refrigerant leaks and moisture infiltration; thereby allowing the use of a smaller volume accumulator portion 108, since a large volume of reserve refrigerant is not required. The reduction of moisture infiltration reduces or eliminates the volume of desiccant needed, resulting in a more compact Unitary HPAC 100. Due to its compact size, the Unitary HPAC 100 may be installed in virtually any location within the body of a motor vehicle that can fit a bread box, such as within the trunk, under the hood, within the dashboard, or even under the seats. If desiccant is desired to capture small amount of moisture infiltration into the refrigerant loop 12, the desiccant may be incorporated into the suction or discharge line.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the intentions without departing from the essential scope thereof. Therefore, it is intended that the invention not be limited to the particular embodiment disclosed as the best mode contemplated for carrying out this invention, but that the invention will include all embodiments falling within the scope of the appended claims.

Having described the invention, it is claimed:

1. A unitary heat pump air conditioner (HPAC), comprising: a plate type heat exchanger assembly having a plurality of plates stacked and hermetically sealed between an upstream end plate and a downstream end plate, defining: a condenser/chiller portion adjacent said upstream end plate, wherein said upstream end plate includes a refrigerant inlet, a hot coolant inlet, and a hot coolant outlet; an accumulator portion adjacent said downstream end plate, wherein said downstream end plate includes a refrigerant outlet, a cold coolant inlet, and a cold coolant outlet; an evaporator/chiller portion sandwiched between said condenser/chiller portion and said accumulator portion; a refrigerant passageway extending through said plate type heat exchanger assembly and in hydraulic communication with said refrigerant inlet and said refrigerant outlet; a hot coolant passageway extending through said condenser/chiller portion and in hydraulic communication with said hot coolant inlet and said hot coolant outlet; and a cold coolant passageway extending through said evaporator/chiller portion and in hydraulic communication with said cold coolant inlet and said cold coolant outlet; wherein said hot coolant passageway and said cold coolant passageway are in non-contact thermal communication with said refrigerant passageway, such that a two phase refrigerant flowing through said refrigerant passageway as part of a refrigerant loop transfers heat energy from a cold side coolant flowing through said cold coolant passageway to a hot side coolant flowing through said hot coolant passageway.

2. The unitary heat pump air conditioner of claim 1, wherein said plate type heat exchanger assembly includes:
a first boundary plate separating said condenser/chiller portion and evaporator/chiller portion; and
a second boundary plate separating said evaporator/chiller portion and accumulator portion;
wherein said evaporator/chiller portion defines a refrigerant expansion chamber extending between said first boundary plate and said second boundary plate.

3. The unitary heat pump air conditioner of claim 2, wherein said plate type heat exchanger assembly further includes:
a refrigerant expansion device having an entry end and an exit end, wherein said refrigerant expansion device is disposed within said refrigerant expansion chamber such that said entry end extends through said first boundary plate and is in hydraulic communication with said refrigerant passageway within said condenser/chiller portion, and said exit end extends into said refrigerant expansion chamber toward said second boundary plate.

4. The unitary heat pump air conditioner of claim 3, wherein said refrigerant expansion device is a tube and said refrigerant expansion chamber is substantially cylindrical, said tube and said refrigerant expansion chamber cooperate to define an annular refrigerant passageway.

5. The unitary heat pump air conditioner of claim 4, wherein said annular refrigerant passageway communicates with said refrigerant passageway within said evaporator/chiller at a location adjacent to said first boundary plate.

6. The unitary heat pump air conditioner of claim 1, wherein said accumulator portion includes an oil pick-up tube in hydraulic communication with said refrigerant outlet and lower volume of accumulator portion.

7. The unitary heat pump air conditioner of claim 6, wherein said downstream end plate includes an interior surface defining a channel depression extending from said refrigerant outlet to a bottom portion of said downstream end plate, and wherein said channel depression cooperates with an immediate adjacent plate to define said oil pick-up tube.

8. The unitary heat pump air conditioner of claim 7, wherein said accumulator portion is defined by said plurality of stacked metallic plates, wherein at least one of said stacked metallic plates includes a lower portion having at least one aperture for hydraulic communication between said stacked metallic plates.

9. The unitary heat pump air conditioner of claim 8, wherein said at least one aperture is in hydraulic communication with said oil pick-up tube.

10. The unitary heat pump air conditioner of claim 9, further comprising an electrically driven compressor having a high pressure discharge side hydraulically connected to said refrigerant inlet and a low pressure intake side hydraulically connected to said refrigerant outlet.

11. The unitary heat pump air conditioner of claim 9, further comprising an electrically driven hot side coolant pump and an electrically driven cold side coolant pump in hydraulic communication with said hot coolant inlet and said cool coolant inlet, respectively.

12. The unitary heat pump air conditioner of claim 11, wherein said plate type heat exchanger assembly, and said electrically driven compressor and said coolant pumps are mounted on a single platform.

13. A plate-type heat exchanger comprising: an upstream end plate having a refrigerant inlet, a hot coolant inlet, and a hot coolant outlet; a downstream end plate having a refrigerant outlet, a cold coolant inlet, and a cold coolant outlet, wherein said downstream end plate is axially spaced from said upstream end plate; a condenser/chiller portion adjacent said upstream end plate, wherein said condenser/chiller portion includes a hot coolant passageway in hydraulic communication with said hot coolant inlet and said hot coolant outlet; an accumulator portion adjacent said downstream end plate having a coolant inlet header and a coolant outlet header in hydraulic communication with said cold coolant inlet and said cold coolant outlet, respectively; an evaporator/chiller portion sandwiched between said condenser/chiller portion and said accumulator portion, wherein said evaporator/chiller portion includes a cold coolant passageway in hydraulic communication with said coolant inlet and outlet headers; a refrigerant passageway extending through said plate-type heat exchanger and in hydraulic communication with said refrigerant inlet and said refrigerant outlet; wherein said hot coolant passageway and said cold coolant passageway are in non-contact thermal communication with said refrigerant passageway such that a two phase refrigerant flowing through said refrigerant passageway as part of refrigerant loop transfers heat energy from a cold side coolant flowing through said cold coolant passageway to a hot side coolant flowing through said hot coolant passageway.

14. The plate-type heat exchanger of claim 13, further comprising:
a first boundary plate separating said condenser/chiller portion and evaporator/chiller portion; and
a second boundary plate separating said evaporator/chiller portion and accumulator portion;
wherein said evaporator/chiller portion defines a refrigerant expansion chamber extending between said first boundary plate and said second boundary plate.

15. The plate-type heat exchanger of claim 14, further comprising:
a refrigerant expansion device having an entry end and an exit end, wherein said refrigerant expansion device is disposed within said refrigerant expansion chamber such that said entry end extends through said first boundary plate and is in hydraulic communication with said refrigerant passageway within said condenser/chiller portion, and said exit end extends into said refrigerant expansion chamber toward said second boundary plate.

16. The plate-type heat exchanger of claim 15, wherein said refrigerant expansion device is a tube and said refrigerant expansion chamber is substantially cylindrical, said tube and said refrigerant expansion chamber cooperate to define an annular refrigerant passageway.

17. The plate-type heat exchanger of claim 16, wherein said annular refrigerant passageway communicates with said refrigerant passageway within said evaporator/chiller at a location adjacent to said first boundary plate.

18. The plate-type heat exchanger of claim 13, wherein said accumulator portion includes an oil pick-up tube in hydraulic communication with said refrigerant outlet and lower volume of accumulator portion.

19. The plate-type heat exchanger of claim 18, wherein said downstream end plate includes an interior surface defining a channel depression extending from said refrigerant outlet to a bottom portion of said downstream end plate, and wherein said channel depression cooperates with an immediate adjacent plate to define said oil pick-up tube.

20. The plate-type heat exchanger of claim 19, wherein said accumulator portion is defined by said plurality of stacked metallic plates, wherein at least one of said stacked metallic plates includes a lower portion having at least one aperture for hydraulic communication between said stacked metallic plates and said oil pick-up tube.

* * * * *